United States Patent [19]

Isogai et al.

[11] 3,889,175

[45] June 10, 1975

[54] DRIVING DEVICE FOR THYRISTOR TYPE AC-DC CONVERTER

[75] Inventors: Tokio Isogai; Eiichi Isikawa; Keiji Fukushi; Hisao Amano; Fumio Ogata; Norio Ikemoto, all of Hitachi, Japan

[73] Assignee: Hitachi, Ltd., Japan

[22] Filed: Oct. 10, 1973

[21] Appl. No.: 404,871

[30] Foreign Application Priority Data
Oct. 12, 1972    Japan.............................. 47-102471

[52] U.S. Cl.................... 321/27 R; 321/11; 336/70; 336/174; 336/175
[51] Int. Cl......................... H02m 1/08; H02m 7/24
[58] Field of Search .......... 321/8, 27 R, 11; 317/73, 317/74, 76; 336/70, 174, 175, 192

[56] References Cited
UNITED STATES PATENTS

| | | | |
|---|---|---|---|
| 3,525,922 | 8/1970 | Abbey................................ | 321/27 R |
| 3,526,824 | 9/1970 | Leowald............................. | 321/27 R |
| 3,654,542 | 4/1972 | Chaupit............................. | 321/27 R |
| 3,654,543 | 4/1972 | Isogai et al........................ | 321/27 R |
| 3,662,248 | 5/1972 | Amano et al. ................. | 321/27 R X |
| 3,723,847 | 3/1973 | Chaupit............................. | 321/27 R |
| 3,742,331 | 6/1973 | Bossi............................ | 321/27 R X |

Primary Examiner—Gerald Goldberg
Attorney, Agent, or Firm—Craig & Antonelli

[57] ABSTRACT

In a driving device for a thyristor type AC-DC converter, a plurality of transformer units each having a magnetic core with a plurality of secondary windings wound thereabout are stacked one upon another and an insulating cylinder through which the primary conductor powered by a pulse generator is passed in an insulated condition is inserted through the transformer units; the secondary windings are connected respectively with the thyristors of the thyristor converter which are connected in series with each other, so as to be controlled in response to the pulse current fed to the primary conductor; a plurality of cylindrical conductors having different diameters are coaxially disposed in the insulating cylinder near the upper and lower ends of the cylinder to form a pair of capacitors electrically separated from each other and the innermost conductors of the capacitors are grounded near the ends of the insulating cylinder so that the surge current flowing from the terminal of the AC-DC converter to the capacitors may be canceled and that the erroneous operation of the converter due to the surge current may be prevented.

17 Claims, 18 Drawing Figures

DRIVING DEVICE FOR THYRISTOR TYPE AC-DC CONVERTER

BACKGROUND OF THE INVENTION

1. Field of the Invention

The present invention relates to an AC-DC converter in which a multiplicity of thyristors are stacked to withstand a high voltage and more particularly to an improvement in a driving device used in a thyristor type AC-DC converter for high voltage D.C. power transmission. An inverter carries out an opposite and similar operation to an AC-DC coverter. Thus the present invention may also be said to relate to a driving device used in a thyristor type inverter.

2. Description of the Prior Art

In a converter for high voltage D.C. power transmission using thyristors, it is useful to use a pulse transformer of electromagnetic coupling type to control the gates of the thyristors connected in series. In such a pulse transformer, a pulse signal from a pulse generator is passed through the primary conductor and voltages are induced in the secondary windings of the transformer units electromagnetically coupled to the primary conductor which voltages are applied to the gates of the respective thyristors to control them.

The primary conductor is passed through an insulating cylinder to be insulated from the main circuit of the converter, and concerning the transformer units arranged in skewered condition on the insulating cylinder, the secondary windings as well as the magnetic cores are insulated by insulating layers.

In a pulse transformer for a converter used in a D.C. power transmission circuit carrying a voltage of about 125 to 500 KV, it is necessary to provide conductive layers for forming a voltage dividing capacitor in the insulating cylinder containing the primary conductor so as to control the surface electric field of the insulating cylinder and to increase the withstand voltage.

As regards the transformer units, in order to obtain satisfactory insulation, a composite assembly of insulating layers and conductive layers is molded with epoxy resin or tightly wrapped by oil-immersed papers.

In such a high voltage circuit, the surge voltage which may intrude from the D.C. transmission line or the A.C. transformer is extremely high. For example, in a system having a 250 KV transmission line, the test voltage is as high as 900 KV and the surge current flowing, due to the intrusion of the external surge, through the stray capacitance to ground of the pulse transformer into the insulating cylinder, is as large as one hundred and several tens of amperes. Moreover, even if the surge current is compensated by any means, the capacitance of the capacitor formed in the insulating cylinder must be set with high precision.

For example, concerning the converter used in a 250 KV D.C. transmission circuit in which two thyristor stack groups, each consisting of thyristors $a$ to $f$ or $g$ to $l$ arranged in the Gratz connection, are cascade-connected and the secondary windings of a three-phase transformer are connected respectively with the two thyristor stack groups, a pulse current I in the form of a surge having a voltage $v$ and duration of $1 \mu S$, flows through the capacitors of the opposite insulating cylinders if there is a difference of capacitance by 20 pF between the capacitors of the opposite insulating cylinders, the pulse current I being such that $$I = C \times dv/dt = 20 \times 10^{-12} \times 900 \times 10^3/1 \times 10^{-6} = 18A.$$

The surge current I generates flux linking with the transformer units so that pulse voltages are induced in the secondary windings.

In a pulse transformer of such a type as described above, the signal current through the primary conductor, inclusive of the exciting current is about several tens of amperes and the current I flowing through the primary circuit due to the surge is large enough to erroneously operate the converter. It is, therefore, necessary to make the difference in capacitance between the voltage dividing capacitors formed in the opposite insulating cylinders as small as possible.

In general, the capacitance of each voltage dividing capacitor is several hundreds of picofarads (pF) and the capacitance to ground is added thereto, so that it is almost impossible to adjust the capacitive difference between the capacitors of the opposite insulating cylinders up to several picofarads (pF). Moreover, the outermost conductive layers of the voltage dividing capacitors are connected through lead wires with the terminal of the thyristor converter to control the potential of the surface portions of the insulating cylinders placed near the terminal. However, with this connection, if an external surge current intrudes through the terminal, the surge current flows also through the lead wires, which in turn generate magnetic fluxes thereabout. Accordingly, the fluxes link with the cores of the transformer units disposed near the lead wires to induce voltage in the secondary windings on the cores, which voltage cause the thyristors to erroneously operate. Further, it also happens that the leakage flux of a heavy current near the pulse transformer would adversely affect the transformer.

SUMMARY OF THE INVENTION

One object of the present invention is to provide a driving device for a thyristor type AC-DC converter which device can prevent the erroneous operation of the converter due to the intrusion of noises such as surges or leakage flux.

Another object of the present invention is to provide a driving device for a thyristor type AC-DC converter which device can stably operate the converter, independent of the difference in capacitance between the voltage dividing capacitors in the insulating cylinders of a pair of pulse transformers associated with a thyristor stack group.

An additional object of the present invention is to provide a driving device for a thyristor type AC-DC converter which device can prevent the erroneous operation of the converter due to the flux generated by a surge current or a heavy current near by, linking with the transformer units disposed near the ends of the insulating cylinders.

According to the present invention, there is provided a driving device for a thyristor type AC-DC converter, in which a plurality of transformer units are stacked one upon another and arranged in skewered condition on insulating cylinders through which a primary conductor is passed and the outputs of the secondary windings of the transformer units are applied to the gates of the thyristors constituting the converter, and in which two separate voltage dividing capacitors are formed in each of the insulating cylinders, the surge current flowing in from above being passed to the upper conductor at the ground potential through the upper capacitor and the surge current flowing in from bottom being passed to the lower conductor at the ground potential through the lower capacitor, so that the pulse transformer may hardly be affected by any surge current.

In a preferred embodiment of the present invention, which is adapted to decrease the influences due to the surge current flowing in through the terminals of the thyristor stack group, the potential to ground of each transformer unit is made nearly equal to the potential of that surface portion of the associated insulating cylinder which is disposed opposite to the transformer unit so that the potential difference between each transformer unit and the corresponding surface portion of the associated insulating cylinder can be made substantially zero and that the surge current which tends to flow from the outermost conductors of the capacitors toward the insulating cylinders through the capacitances, can be passed to the conductors at the ground potential near the terminal through which the surge intruded.

In this way, owing to the split capacitors in each insulating cylinder, the surge current flowing in through the upper or lower terminal is returned through the capacitor toward the entrance thereof to substantially cancel the component of the surge current along the axial direction of the insulating cylinder.

In another preferred embodiment of the present invention, the conductive layers of each capacitor in each insulating cylinder are in staggered relation to each other and each conductive layer is placed opposite to only one corresponding transformer unit, so that the potential of each transformer unit may be made substantially equal to that of the surface portion of the insulating cylinder opposite to the transformer unit. In this case, a shielding conductive layer should preferably be provided on or in the insulating material forming a part of each transformer unit in opposite relation to the insulating cylinder. Each transformer unit has a plurality of secondary windings wound about a core of ferromagnetic material with an insulating layer coated thereon, and according to the present invention, the conducting shield mentioned above may be kept at the same potential as that secondary winding of the transformer unit which is connected with the thyristor at the intermediate potential of the thyristor stack corresponding to the transformer unit so that each transformer unit may be maintained at the intermediate potential of the thyristor stack mated with the transformer unit.

It is also possible to provide a second conducting shield in the insulating layer on the core of each transformer unit and to connect both the shield together so as to maintain the core at the intermediate potential.

Moreover, instead of the provision of the second conducting shield, the already provided shield may be connected with the core to attain the same effect.

Further, according to the present invention, there is provided a means for canceling the fluxes linking with the cores of the transformer units near the lead wires connected with the terminal of the converter which fluxes are generated when a surge current flows through the lead wires.

Such a means is a pair of differential windings wound about the cores of a pair of transformer units respectively of the insulating cylinders, the transformer units being nearest the lead wires.

In a preferred embodiment of the present invention, the electrical connections between the lead wires and the outermost conductors of the capacitors of the insulating cylinders are by means of ring-shaped conductors or horn-shaped or disc-shaped conductors having a diameter larger than that of the core of the transformer unit, which have a plurality of radially extended conductor leads connected with the outermost conductive layers. With this structure, the absolute value of the flux linking with each core can be reduced and the flux circulates through the core, so that the flux can be canceled by means of the differential windings.

DESCRIPTION OF THE PREFERRED EMBODIMENTS

Figure 2:
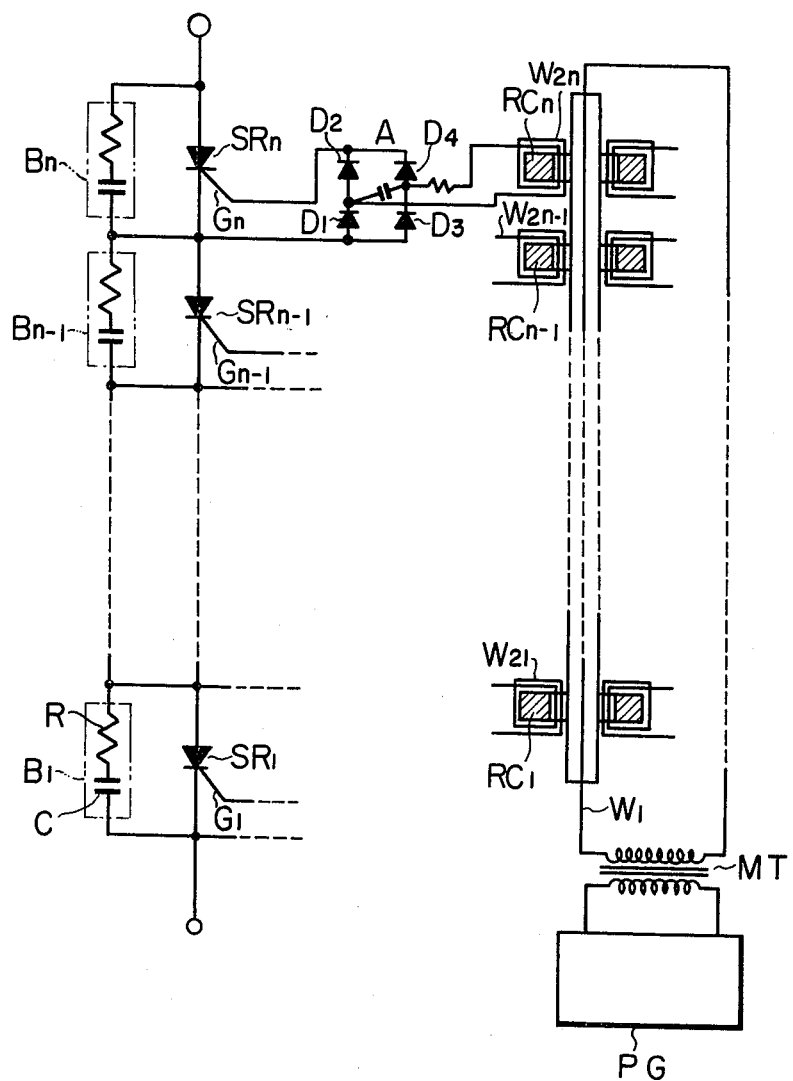
FIG. 2 shows a driving circuit for such a converter as shown in FIG. 1.

FIG. 2 shows an exemplary drive circuit for a high voltage thyristor type AC-DC converter using a pulse transformer, with only one of thyristor stacks depicted for simplicity's sake. In FIG. 2, thyristors $SR_1$, . . . , $SR_{n-1}$, and $SR_n$ respectively having gates $G_1$, . . . , $G_{n-1}$ and $G_n$ 72 are connected in series with each other to form one stage and each of voltage dividing circuits $B_1$, ..., $B_{n-1}$ and $B_n$, which serve to equalize the voltages applied to the respective thyristors, consists of a resistor R and a capacitor C. A gate control signal rectifying circuit A is connected between the gate and the cathode of each thyristor and has a full-wave rectifying configuration having diodes $D_1 - D_4$, as shown in FIG. 2.

A pulse current generator PG is electromagnetically coupled to the primary conductor $W_1$ of a pulse transformer. The pulse transformer further has magnetic cores $RC_1$, ..., $RC_{n-1}$ and $RC_n$ stacked one upon another, through which the primary conductor $W_1$ is passed, and secondary windings $W_{21}$, ... $W_{2n-1}$ and $W_{2n}$, each having plural turns, wound about the magnetic cores. The output of each secondary winding is applied through the gate control signal rectifying circuit A to the gate of the associated thyristor.

Each of transformer units which is described later, consists of the magnetic cores $RC_1$, ..., $RC_{n-1}$ and $RC_n$ the secondary windings $W_{21}$, ..., $W_{2n-1}$ and $W_{2n}$. If, with this circuit, pulse current is supplied from the pulse current generator PG to the primary conductor $W_1$, then pulse currents are induced simultaneously in the secondary windings $W_{21}$, ..., $W_{2n-1}$ and $W_{2n}$ so that the thyristors $SR_1$, ..., $SR_{n-1}$ and $SR_n$ are simultaneously rendered conductive.

Figure 3:
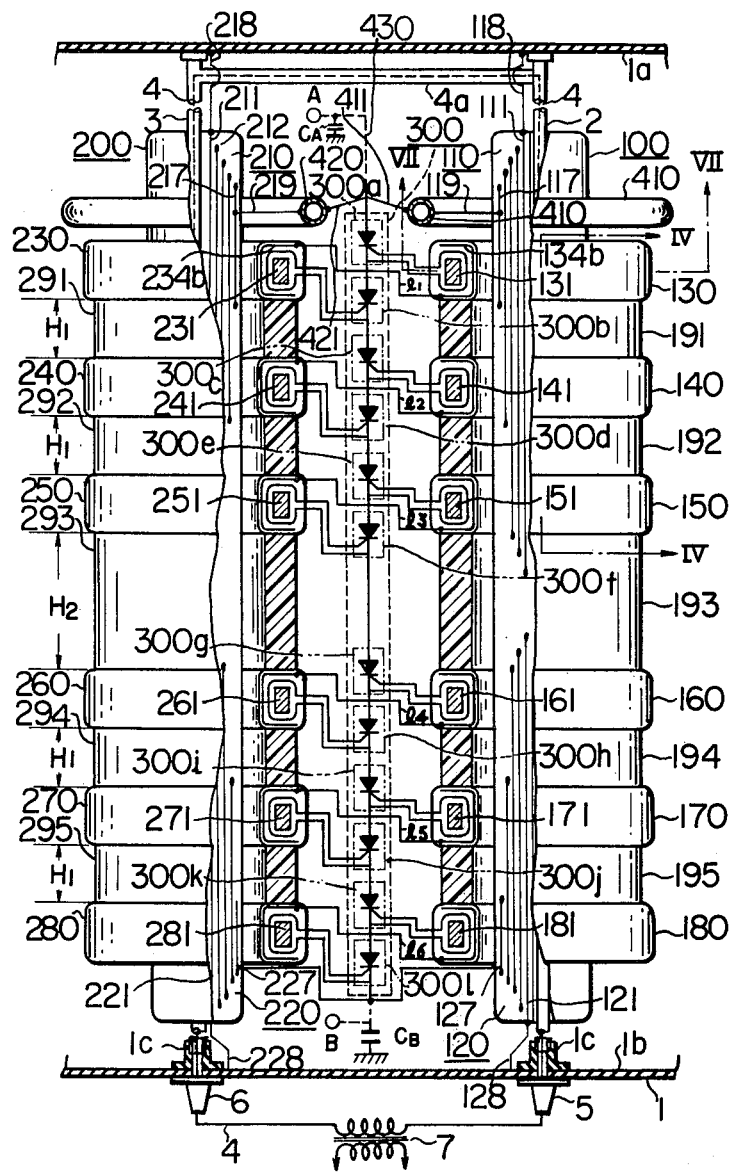
FIG. 3 is a front view, partially broken, of a driving device for a thyristor type AC-DC converter as one embodiment of the present invention.

FIG. 3 shows a structure of a pulse transformer according to the present invention, with a thyristor stack connected therewith. A tank 1 which houses one stage of an AC-DC converter and is grounded, is filled with insulating medium such as insulating oil or gas. Insulating cylinders 100 and 200 vertically and parallelly disposed in the tank 1 serve as bushings and reinforcing tubes 2 and 3 of, for example, stainless steel are inserted in the insulating cylinders 100 and 200. The upper and lower ends of the reinforcing tubes 2 and 3 are mechanically fixed respectively to the top and bottom walls 1a and 1b of the tank 1. In this embodiment shown in FIG. 3, only the upper ends of the reinforcing tubes are connected electrically with the tank 1 and the lower ends of the reinforcing tubes are insulated from the tank 1 by means of insulating bushes 1c. A primary conductor 4 of a pulse transformer is passed through the reinforcing tubes 2 and 3 and a shield wire 4a forms a part of the primary conductor 4 near the upper ends of the reinforcing tubes 2 and 3. The ends of the primary conductor 4 are connected with terminals 5 and 6 provided in the bottom wall 1b of the tank 1 and insulated from the tank 1, and these terminals 5 and 6 are connected with a matching transformer 7.

Voltage dividing capacitors 110 and 120, and 210 and 220 are formed respectively in the insulating cylinders 100 and 200, as shown in FIG. 3. Each of the voltage dividing capacitors has a plurality of coaxial conductive layers having different axial lengths, with an axially shorter layer disposed around an axially longer layer.

Figure 4:
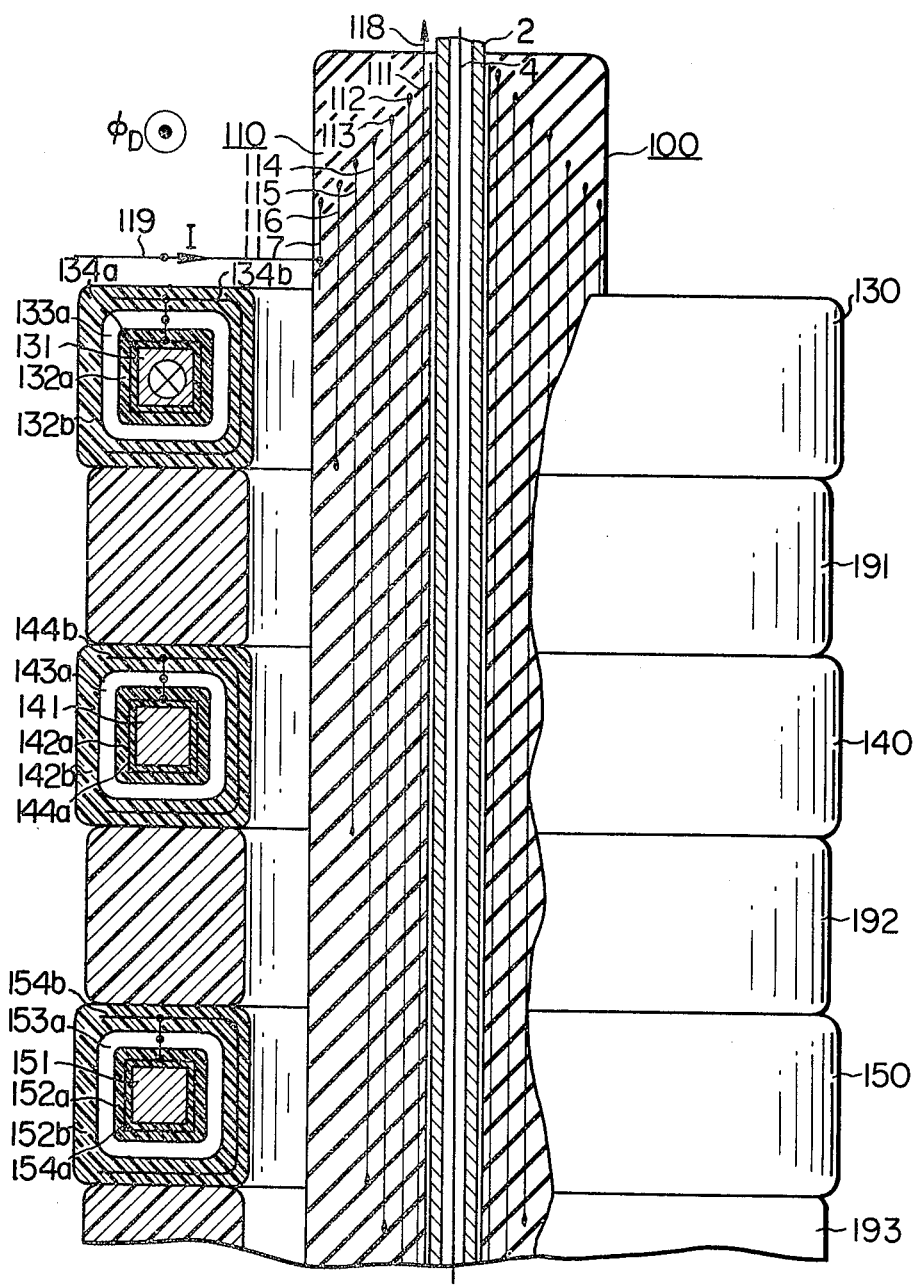
FIG. 4 is a cross section, on an enlarged scale, taken along line IV—IV in FIG. 3.

In FIG. 4 which is a cross section taken along line IV—IV in FIG. 3, the voltage dividing capacitor 110 consists of a plurality of coaxial conductive layers 111 112, 113, 114, 115, 116 and 117 having different axial lengths, with a shorter layer around a longer layer and with each layer in staggered relation to another. The voltage dividing capacitors 120, 210 and 220 also have similar structure in which a plurality of coaxial conductive layers having different axial lengths are disposed in the decreasing order of length from innermost to uppermost layer and in the staggered relation to each other. The innermost layers 111, 121, 211 and 221 of the capacitors 110, 120, 210 and 220 are connected respectively through ground wires 118, 128, 218 and 228 to the top and bottom walls 1a and 1b of the tank 1. All the conductive layers of the voltage dividing capacitors in each insulating cylinder are insulated from one another.

Namely, in the insulating cylinder 100, the innermost layer 111 of the capacitor 110 and the innermost layer 121 of the capacitor 120 are disposed apart by a predetermine distance and insulated from each other and the conductive layer 111 is connected through a lead wire 118 with the top wall 1a of the tank 1 while the conductive layer 121 is connected through a lead wire 128 with the bottom wall 1b of the tank 1. In like manner, in the insulating cylinder 200, the innermost layer 211 of the capacitor 210 and the innermost layer 221 of the capacitor 220 are disposed apart by a predetermined distance and insulated from each other and the conductive layer 211 is connected through a lead wire 218 with the top wall 1a of the tank 1 while the conductive layer 221 is connected through a lead wire 228 with the bottom wall 1b of the tank 1.

Figure 5:
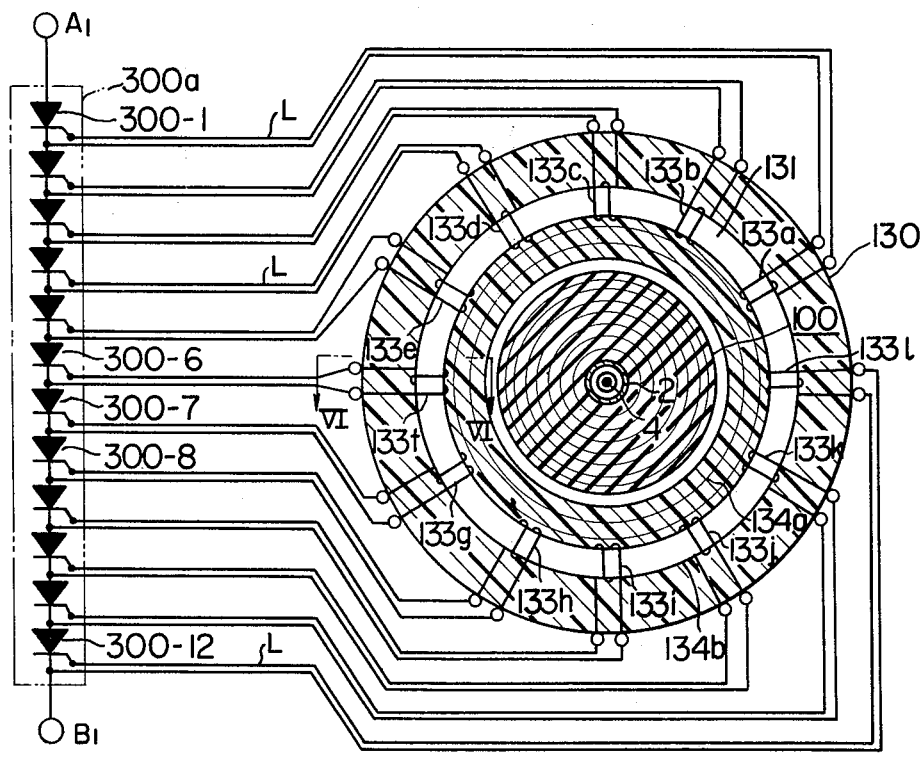
FIG. 5 shows the connection between the thyristors and one of the transformer units.

A thyristor stack group 300, disposed between the insulating cylinders 100 and 200, consists of a plurality of thyristor stacks 300a, 300b, ..., 300l, each of the thyristor stacks, for example, thyristor stack 300a consisting of a plurality of series-connected thyristors, as shown in FIG. 5, and the ends of the thyristor stack group 300 are connected with an AC input terminal A and a DC output terminal B. Capacitors $C_A$ and $C_B$ are respectively connected between the AC input terminal A and the earth and between the DC output terminal B and the earth.

In an inverter configuration, the AC input terminal A serves as an AC output terminal and the DC output terminal B as a DC input terminal. A plurality of transformer units constituting a pulse transformer which supply gating signals for the thyristors of the thyristor stacks of the thyristor stack group 300, are arranged in a stacked relation in the insulating cylinders 100 and 200 along the longitudinal directions of the cylinders 100 and 200. Namely, in the insulating cylinder 100, the transformer units 130 to 180 are stacked one upon another with insulating spacers 191 to 195 inserted between the adjacent units and, also is the insulating cylinder 200, insulating spacers 291 to 295 are inserted respectively between the transformer units 230 and 240, between the transformer unit 240 and 250, ..., and between the transformer units 270 and 280 to form an alternating stack of the transformer unit and the insulating spacer. In this embodiment, six transformer units are arranged in each of the insulating cylinders 100 and 200, but it should be noted that the number of the units is not limited to six.

The transformer units of each of the insulating cylinders 100 and 200 are divided into two groups associated with the two voltage dividing capacitors and, in an preferred embodiment, an even number of transformer units is to be arranged in each of the insulating cylinders 100 and 200.

In the embodiment shown, the insulating spacer 193 dividing the group consisting of the units 130, 140 and 150 and the group consisting of the units 160, 170 and 180 and the insulating spacer 293 dividing the group consisting of the units 230, 240 and 250 and the group consisting of the units 260, 270 and 280, have a thickness $H_2$ larger than the thickness $H_1$ of the other insulating spacers so as to provide a greater withstand voltage.

Figure 6:
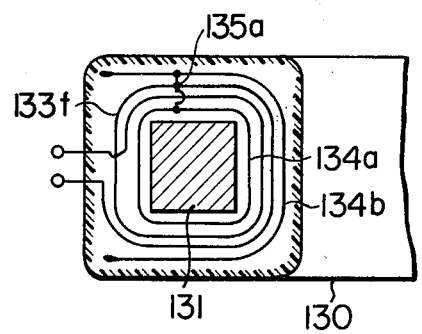
FIG. 6 is a cross section taken along line VI—VI in FIG. 3.

Each of the transformer units comprises a core of ferromagnetic material such as permalloy, a plurality of secondary windings wound about the core and insulator insulating the secondary winding from each other. Namely, as shown in FIGS. 4 to 6, ring-shaped magnetic cores 131, 141 and 151 are wrapped respectively by insulating layers 132a, 142a and 152a and a plurality of secondary windings 133a to 133l, 143a to 143l, and 153a to 153l are wound respectively about the magnetic cores 131, 141 and 151 coated with the insulating layers 132a, 142a and 152a and equally distanced from each other in the circumferential direction of each core, the number of the secondary windings on each core being equal to that of the thyristors constituting the thyristor stack associated with the core. And insulating layers 132b, 142b and 152b are coated on the cores 131, 141 and 151 with the secondary windings 133a to 133l, 143a to 143l, and 153a to 153l. The insulating layers 132a, 132b, 142a, 142b, 152a and 152b are usually made of insulating base, e.g., insulating paper, cotton cloth, glass fiber or synthetic resin film, impregnated with thermosetting synthetic resin such as epoxy resin.

Further, conducting shields 134a, 134b, 144d, 144b, 154a and 154b are embedded in the insulating layers 132a, 132b, 142a, 142b, 152a and 152b, respectively. These conductor shields may be electrically connected with the secondary windings.

For example, concerning the transformer unit 130 shown in FIG. 5, the output voltages of the twelve secondary windings 133a to 133l are applied through lead wires L and via rectifying circuits not shown, between the gates and the anodes of the respective thyristors 300-1 to 300-12 constituting a single thyristor stack 300a (between terminals $A_1$ and $B_1$) of the thyristor stack group 300. The secondary winding 133f assuming an intermediate potential of the voltage across the thyristor stack 300a is connected through a lead wire 135a (see FIG. 6) with the conductor shields 134a and 134b to maintain the potentials of the shields at the intermediate one with respect to the voltage across the thyristor stack 300a. Alternatively, it is possible to connect the conducting shields with the secondary winding coupled to the uppermost or lowermost thyristor of the thyristor stack and it is also possible to connect with the conducting shield 134b the magnetic core 131 instead of the conducting shield 134a, by means of the lead wire 135a. The outer shield 134b having a structure enclosing the secondary windings need not completely surround the secondary windings but it is preferably to provide at least between the magnetic core 131 and the insulating cylinder 100.

The transformer units 160, 170, 180, 230, 240, 250, 260, 270 and 280 have the same constitution as the transformer unit 130, 140 or 150. In this way, the secondary windings of each transformer unit are connected through the associated rectifying circuit with the gates and the anodes of the thyristors of the associated thyristor stack of the thyristor stack group 300.

Since the conducting shields of each transformer unit are connected with the secondary winding maintained at the intermediate potential of the transformer unit, the shields are forcibly kept at a potential equal to that of the associated part of the thyristor stack group 300.

Moreover, as shown in FIG. 3, the conducting shields of each of the corresponding pairs of the transformer units 130 and 230, 140 and 240, 150 and 250, 160 and 260, 170 and 270, and 180 and 280 associated respectively with the insulating cylinders 100 and 200 are connected through corresponding one of lead wires $l_1$ to $l_6$, with each other and with a certain point of the corresponding thyristor stack.

The conductive layers of the voltage dividing capacitors 110, 120, 210 and 220 are disposed in opposite to the respective transformer units so that the transformer units may be kept approximately at potentials approximately equal to the potentials at the corresponding conductive layers of the capacitors. Accordingly, the potentials of the transformer units are made roughly equal to the potentials at the surface portions of the insulating cylinders opposite to the transformer units and the surfaces of the transformer units and the opposite conductive layers of the voltage dividing capacitors form capacitors having high impedances to alternating current, so that surge currents from the transformer units to the voltage dividing capacitors can be reduced to a very small value.

The structure described just above will be further detailed in conjunction with the voltage dividing capacitor 110 of the insulating cylinder 100, with the aid of FIG. 4. In FIG. 4, the transformer units 130, 140 and 150 are placed opposite to the conductive layers 116, 115 and 114 of the capacitor 110, respectively.

Since the outermost layer 117 of the capacitor 110 is connected through a lead wire 119, a ring-shaped conductor 410 and a lead wire 411 with the AC input terminal A of the thyristor stack group 300, the ring-shaped 410 and the lead wire 411 being described later, the potentials of the layers of the capacitor 110 decreases from the outermost layer 117 toward the innermost grounded layer 111. In this case, it is easy to make the potentials of the conductive layers 114, 115 and 116 roughly equal to those of the corresponding transformer units 150, 140 and 130 by appropriately adjusting the arrangement of the conductive layers 111, 112 and 113.

Similarly, the outermost layer 217 of the capacitor 210 in the insulating cylinder 200 is connected with the AC input terminal of the thyristor stack group 300 through a lead wire 219, a conductor ring 420 and a lead wire 421, the conductor ring 420 and the lead wire 421 being described later.

Moreover, the outermost conductive layers 127 and 227 of the voltage dividing capacitors 120 and 220 located near the DC output terminal B are connected directly or through conductor rings with the DC output terminal B. Accordingly, the outermost conductive layers 117, 127, 217 and 227 of the voltage dividing capacitors 110, 120, 210 and 220 are kept at a potential equal to that at the input or output terminal of the thyristor stack group 300.

Figure 8:
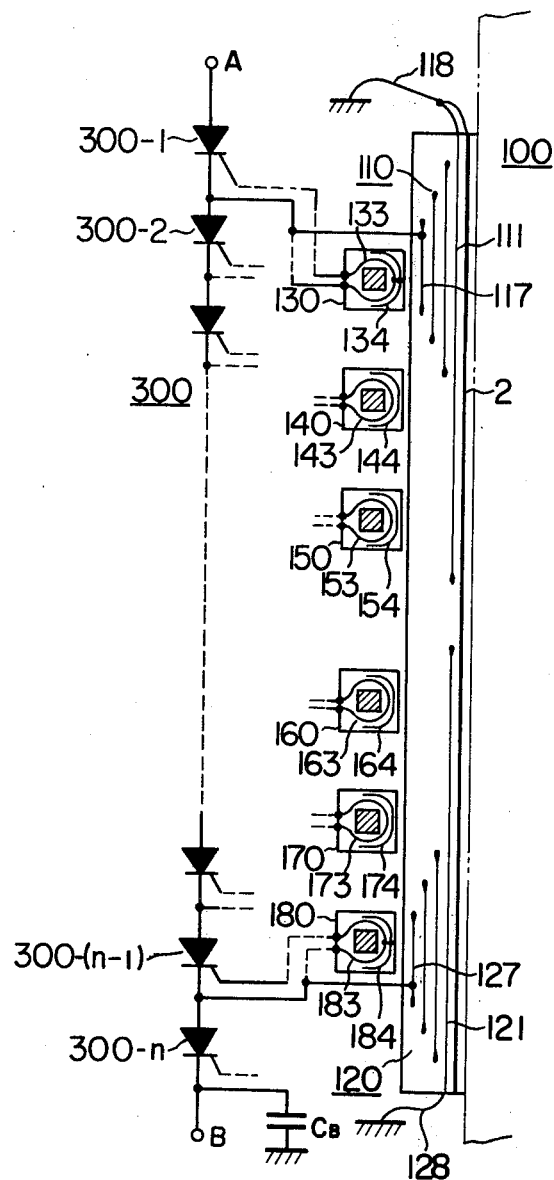
FIG. 8 shows a constitution of a driving device for a thyristor type AC-DC converter as another embodiment of the present invention.

Furthermore, a modified structure of the voltage dividing capacitor can be employed in place of that described above. The modification is shown in FIG. 8. In FIG. 8, all the transformer units except the uppermost and lowermost ones are disposed opposite to the innermost conductive layers and all the conductive layers except the innermost ones serve mainly to control the potentials at the ends of the insulating cylinders. With this structure, also, there is a sufficient distance between the transformer units and the innermost layers and therefore a large impedance can be defined, so that surge current, which may otherwise flow from the transformer units through the capacitors to the earth, can be considerably reduced.

Now, the operation of the device described above will be described. In case of controlling the conduction of the thyristor stack group 300 as shown in FIG. 3, if a signal voltage from a pulse signal generator (not shown) is sent through a matching transformer 7 to the primary conductor 4, signal voltages are simultaneously induced in the secondary windings of the transformer units 130, 140, . . . , 180, 230, 240, . . . , and 280 electromagnetically coupled through the magnetic core to the primary conductor 4. And, in response to the induced signal voltages, the thyristors are simultaneously rendered conductive to control the conduction of the thyristor stack group 300. Even if an impulse surge intrudes through the AC input terminal A or the DC output terminal B during the normal operation, the device according to the present invention can be effectively prevented from erroneously operating owing to the surge.

For example, concerning the insulating cylinder 100, when a surge reaches the AC input terminal A, most part of the surge intrudes through the lead wire 411, the conductor ring 410 and the lead wire 119 into the transformer unit 130 and the voltage dividing capacitor 110. Then the surge is passed through the conductive layers 117 to 111 of the capacitor 110 and the lead wire 118 to the top wall 1a of the tank 1. In this case, the surge current flowing into the capacitor 110 opposite to the transformer units 130, 140 and 150 takes a direction upward again through the conductive layer 111. Accordingly, the surge components flowing in and out cancel each other so that no voltage is induced in each secondary winding of each transformer unit.

As described above, according to the present invention, two voltage dividing capacitors are disposed, in each insulating cylinder, separated and insulated from each other so that the thyristor stack group can be prevented from erroneously operating due to the surge intruding into the voltage dividing capacitor. The surge from the terminal A also reaches the transformer units 130, 140 and 150, but since the potentials of the surface portions of the insulating cylinder 100 opposite to the transformer units are made equal to those of the transformer units or since those surface portions of the insulating cylinder are so constructed as to have a high impedance, then the surge current passing from the transformer units to the capacitor 110 can be considerably reduced so that a voltage enough to drive the thyristors is not induced in any transformer unit.

Figure 1:
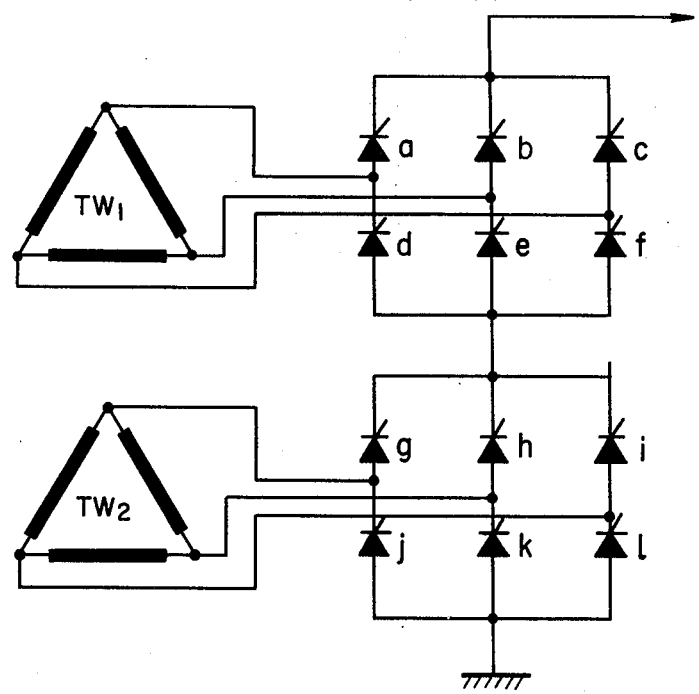
FIG. 1 is an example of the circuit of a conventional high voltage thyristor type AC-DC converter.
Figure 9:
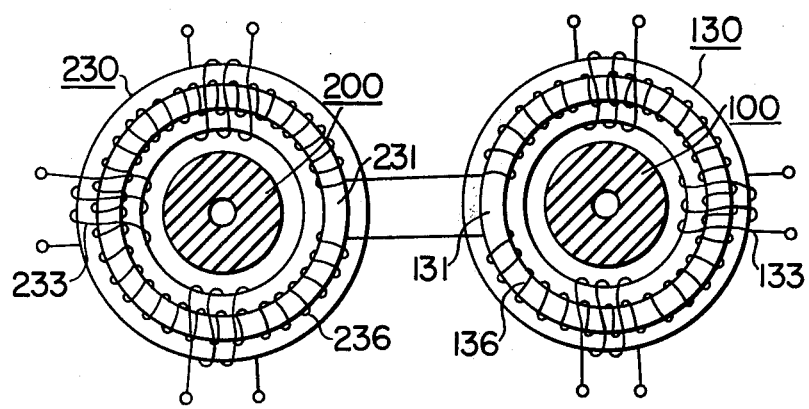
FIG. 9 illustrates the differential windings provided in a pair of transformer units.

Moreover, according to the present invention, a more effective device has been proposed to further reduce the surge current. Such a device is shown in FIG. 9, in which only one stage of the whole device is depicted for simplicity's sake, but the single segment will suffice for the purpose of any-one skilled in the art understanding the full view of the device. Namely, the surge current flowing into the transformer units can be reduced by providing differential windings about the magnetic cores 131 and 231 of the transformer units 130 and 230 located opposite to each other. In this case, it is also possible to discard the lead wires $l_1$ to $l_6$ if the conducting shields of each pair of opposite transformer units are connected with each other through the differential windings.

The foregoing description has been given to the case where the surge reaches the input terminal A, but the same is true also for the case where the surge reaches the output terminal B. Thus, the present invention proves to be very useful to prevent the erroneous operation of the thyristor stack group.

In the preceding embodiments, the conducting shields 134 and 234 or 184 and 284 of the uppermost or lowermost transformer units 130 and 230 or 180 and 280 are connected with the input or output terminal of the thyristor stack group 300, but it is also possible to connect the outermost conductive layers 117 and 127 of the voltage dividing capacitors 110 and 120, through the connection leads of the secondary windings 133 and 183, with the anode of the thyristor 300-1 or 300-(n−1) near the input or output terminal of the thyristor stack group 300. In such a case, though the surge current passes through the thyristor 300-1 or 300-n, no problem will be caused if the withstand voltages of these parts are increased.

With the pulse transformer having such a structure as described above, the erroneous operation due to the surge current having intruded in the voltage dividing capacitors can be prevented but the erroneous operation due to the surge traveling from the AC input terminal A to the voltage dividing capacitors is sometimes performed. Namely, when a surge current I flows in through the terminal of the thyristor stack group 300, a part of the surge current I is led through a lead, e.g., lead wire 119 as in FIG. 4, to the conductive layer 117 and further to the earth. And, that part of the surge current I which flows through the lead wire gives rise to the erroneous operation of the pulse transformer and therefore of the thyristor device.

Namely, as seen in FIG. 4, when a surge current I flows through the lead wire 119, the surge current I generates magnetic flux $\phi_D$. A part of this flux $\phi_D$ passes through the core 131 of the transformer unit 130 so that a voltage is induced in the secondary windings 133 to erroneously operate the thyristors connected to the windings 133.

One artifice to prevent this phenomenon is to separate the lead wire 119 from the transformer unit 130 by a distance long enough to eliminate the influence due to the surge current. However, this is not preferable because in such a case the length of each insulating cylinder is too long with the result that the overall device is too great in size.

Another artifice is to make the secondary windings 133 as remote from the lead wire 119 as possible by shifting the windings 133 circumferentially along the core 131. In this case, however, the dimentions of the transformer unit must be increased to secure the insulations between the secondary windings of the transformer unit so that the electromagnetic coupling between the primary conductor and the secondary windings is deteriorated. In addition, the distance to the corresponding thyristor stack is greater so that the size of the overall device is too large.

Therefore, according to the present invention, a pair of differential windings 136 and 236 differentially connected with each other are wound about those portions of the cores 131 and 231 which are crossed by the lead wires 119 and 219. If, in this structure, surge currents flow toward the insulating cylinders 100 and 200 through the lead wires 119 and 219, magnetic fields are generated around the lead wires 119 and 219. Parts of the fluxes linking with the cores 131 and 231 are canceled by the differential windings 136 and 236 and no harmful voltage is induced in the secondary windings near the lead wires. Accordingly, the erroneous operation of the thyristors connected with these secondary windings can be prevented.

Figure 7:
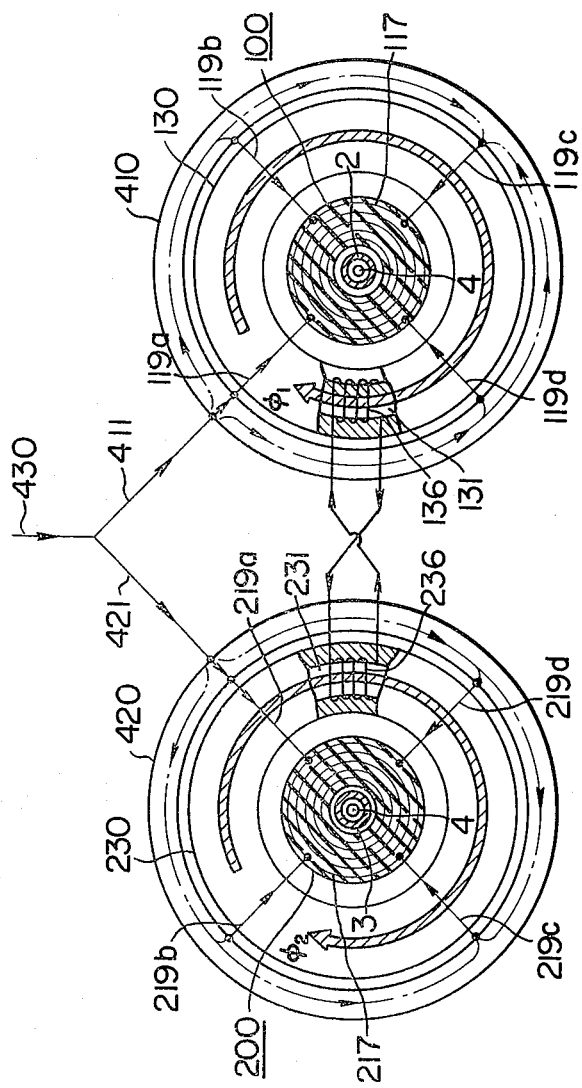
FIG. 7 is a cross section taken along line VII—VII in FIG. 3.

FIG. 7 shows in cross section the structure in which ring shaped conductors 410 and 420, each having a diameter larger than that of the core of each transformer unit, are provided as means for conducting current from the lead wire 430 connected with the terminal of the thyristor stack group to the innermost conductive layers 117 and 217 of the voltage dividing capacitors 110 and 210 and a plurality of lead wires 119a to 119d and 219a to 219d are connected radially between the ring-shaped conductors 410 and 420 and the conductive layers 117 and 217. In this structure, the surge current takes a plurality of radial path into the conductive layers and the fluxes $\phi_1$ and $\phi_2$ generated by the surge current and linking with the cores 131 and 231 respectively circulate through the 131 and 231 as shown in FIG. 7. Therefore, these fluxes can be completely canceled by the differential windings 136 and 236.

The merit of providing multiple paths for the introduction of the surge current is that since the surge fluxes can circulate through the cores of the transformer units, the fluxes can be completely canceled.

Figure 10:
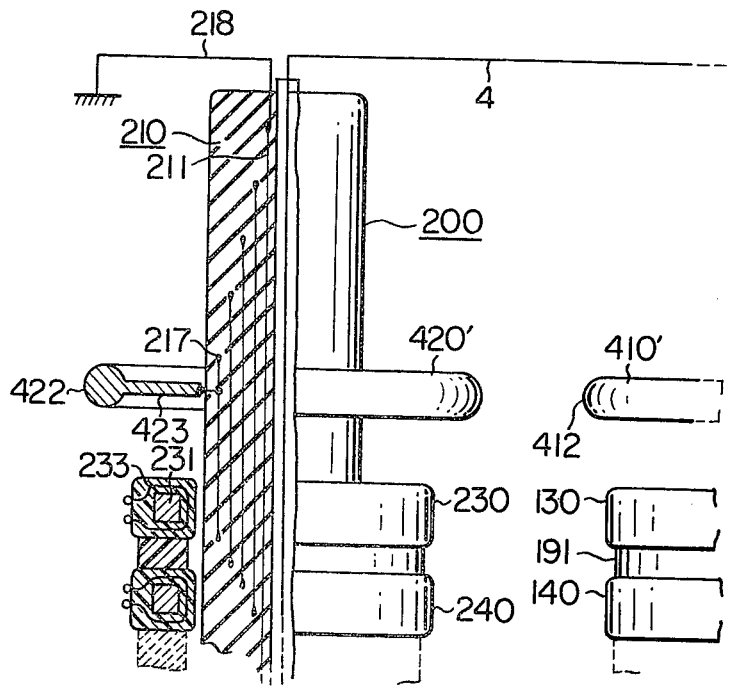
FIG. 10 shows in front view an example of the arrangement of the end portion of the insulating cylinder and the transformer units, used in the driving device according to the present invention.
Figure 11:
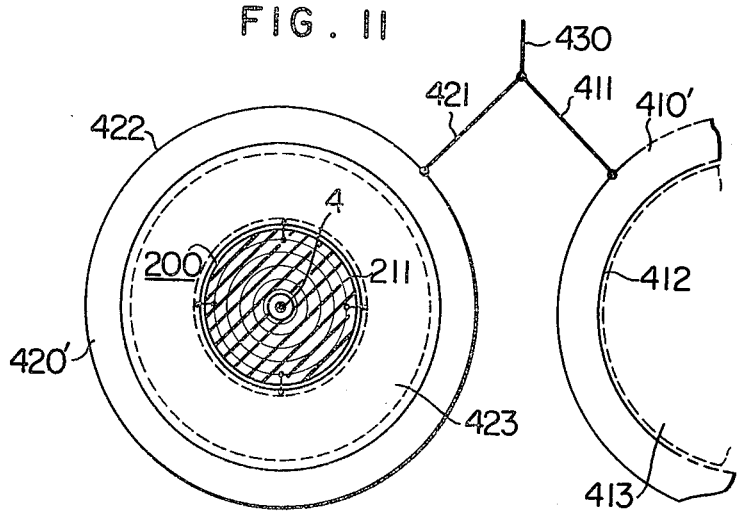
FIG. 11 is a plan view associated with FIG. 10.

Moreover, according to the present invention, disc-shaped conductors 410' and 420' as shown in FIGS. 10 and 11 may be used as means for passing currents from the ring-shaped conductors 410 and 420 to the conductive layers 117 and 217. The disc-shaped conductors 410' and 420' have rounded portions 412 and 422 along their outer peripheries serving to relax the concentration of electric fields and flat portions 413 and 423 from the inner peripheries of which plural conductors are connected to the conductive layers 117 and 217 as shown in FIG. 11, the flat portions being so designed as to cover the upper surfaces of the transformer units 130 and 230. The merit of this structure is that the effect of the embodiment of FIG. 7 is much improved since the paths for the surge currents can be formed on any portions on the entire surfaces of the disc-shaped conductors.

Figure 13:
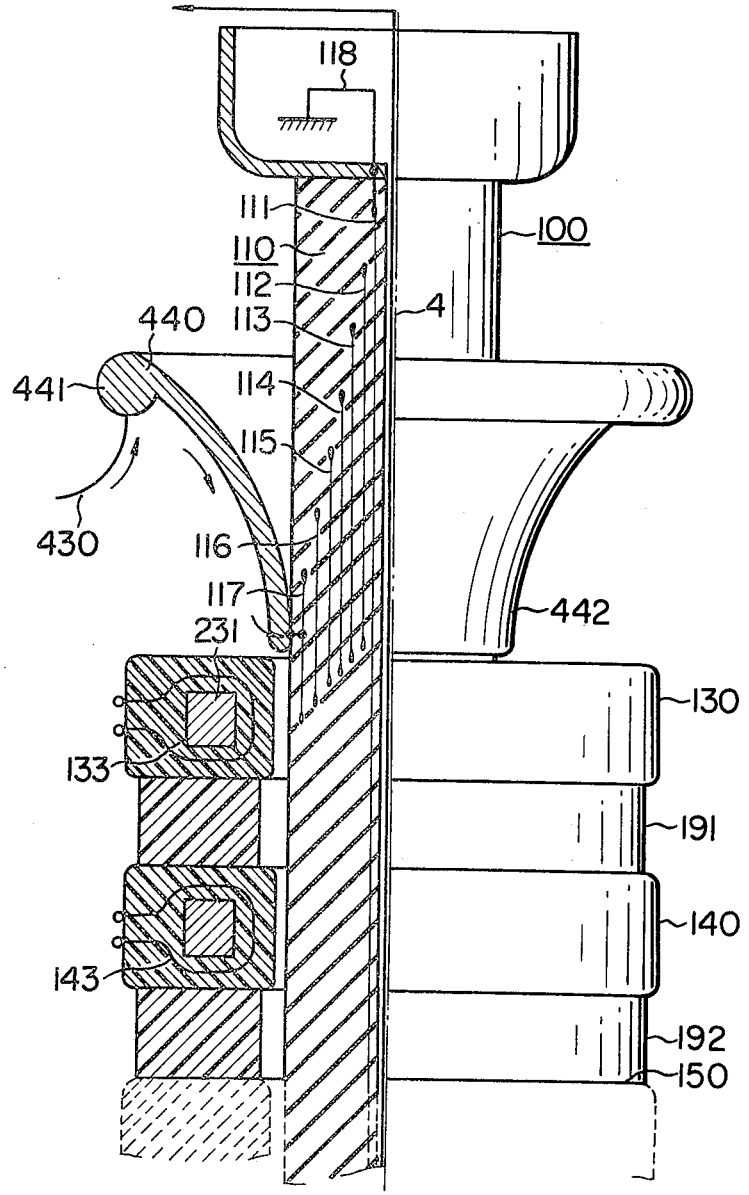
FIG. 13 shows in front view, partially broken, another structure of the end portion of the insulating cylinder used in the driving device according to the present invention.

FIG. 13 shows a horn-shaped conductor 440 to pass the surge current from outside the transformer unit 130 (or 230) to the conductive layer 117 (or 217). The horn-shaped conductor 440 has a large-diameter portion 441 with a diameter larger than that of the transformer unit 130 and a small-diameter portion 442 connected electrically with the conductive layer 117. Thus, the horn-shaped conductor 440 can serve as a shield for controlling the electric field at the end of the insulating cylinder.

Figure 12:
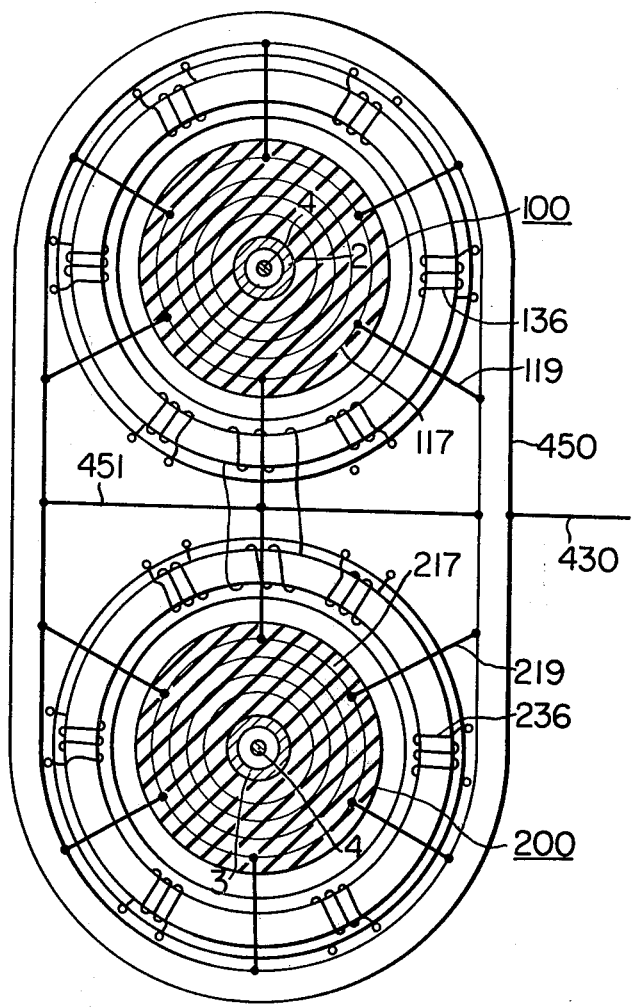
FIG. 12 shows a structure of the end portion of the insulating cylinder used in the driving device according to the present invention.

In all the preceding embodiments, one conductor is provided for each insulating cylinder, but only a common conductor 450 may be provided for both the insulating cylinders 100 and 200, as shown in FIG. 12, the conductor 450 being connected with the outermost conductor layers 117 and 217 in the insulating cylinders 100 and 200. In this case, it is also possible to provide a bridge conductor 451 on the common conductor 450 so as to form a path between the insulating cylinders 100 and 200.

The inverters' experiments have reveals that when an impulse voltage of 900 KV is applied to a thyristor DC converter having rating voltage of 250 KV, the surge current flowing through the primary conductor of the transformer unit 130 is only several amperes, and that the erroneous operation of the thyristors connected with the secondary windings of the transformer unit 130 can be prevented.

The above described embodiments are all shown as applied to prevent surge signals as noises, and in the following are described embodiments applied to deal with a heavy-current source near the pulse transformer, e.g., stray flux generated by the heavy current flowing through the thyristor converter.

Figure 14:
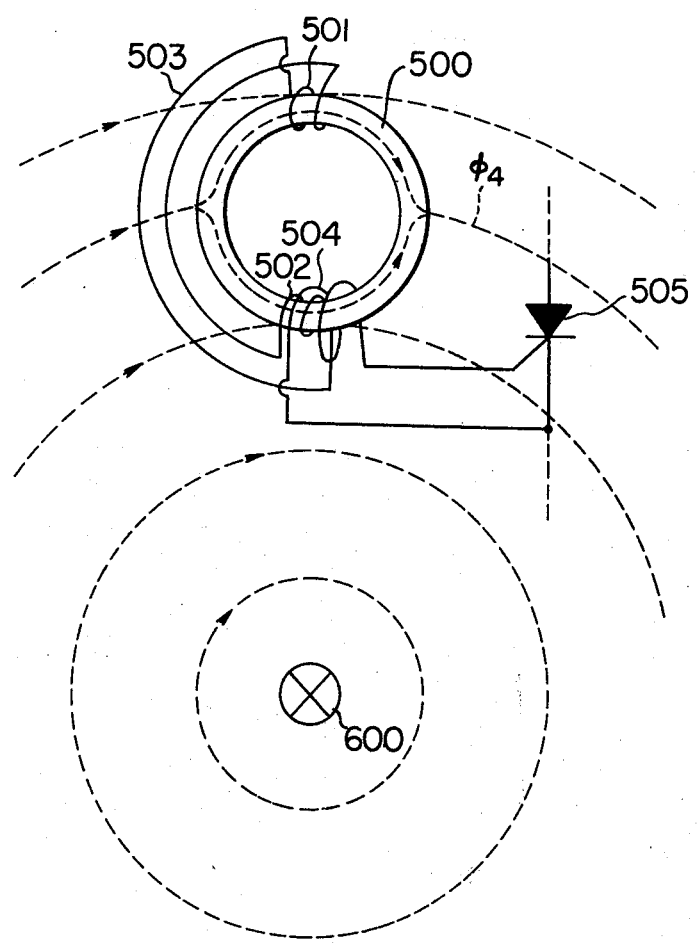
FIG. 14 is an illustrative view useful for the explanation of the compensating windings provided in a transformer unit.

FIG. 14 illustrates the operating principle of compensating windings provided in each transformer unit according to the present invention. In FIG. 14, a pair of compensating windings 501 and 502, each having a single turn, are wound about a magnetic core 500 substantially in diametrically opposite relation to each other and the compensating windings 501 and 502 are differentially connected with each other through lead wires 503. A secondary winding 504 is wound about the core 500 in the vicinity of one of the compensating windings, e.g., compensating winding 502, and the output of this secondary winding 504 is applied through a rectifying circuit not shown, between the gate and the anode of a thyristor 505. If a heavy current 600 exists near the core 500, the current 600 generates magnetic flux as indicated by concentric dotted circles. A part of the flux $\phi_4$ passes through the core 500 to induce a noise current in the secondary winding 504. Simultaneously, the partial flux $\phi_4$ also links with the compensating windings 501 and 502 so that counter-flux current flows through the compensating windings to cancel the flux $\phi_4$. Therefore, the noise current can be prevented from being induced in the secondary winding 504.

Figure 15:
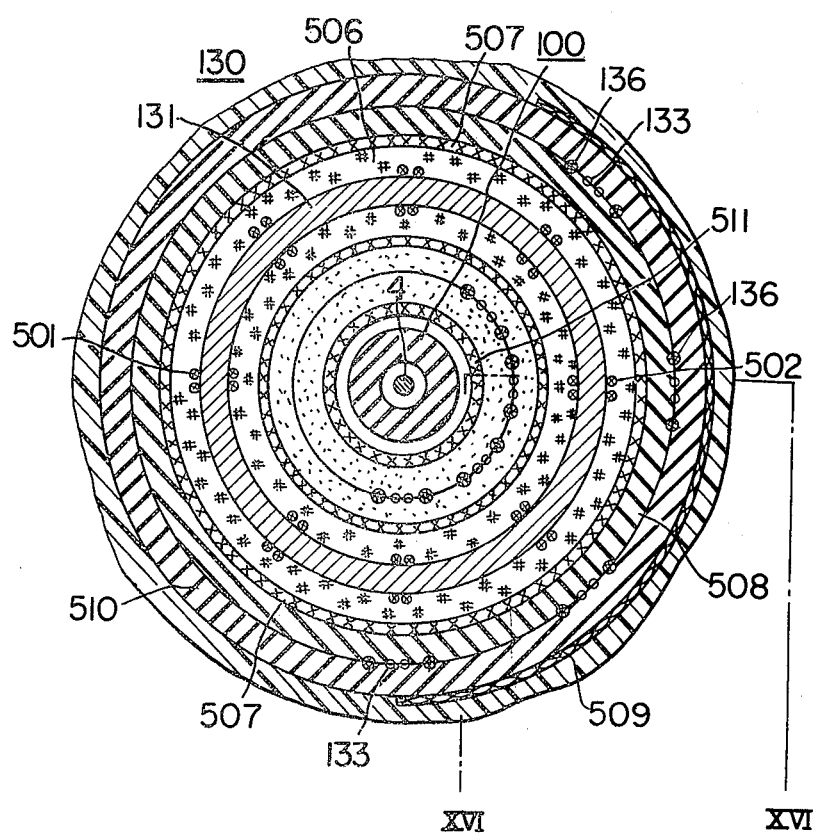
FIG. 15 is a cross section of a transformer unit according to the present invention.
Figure 16:
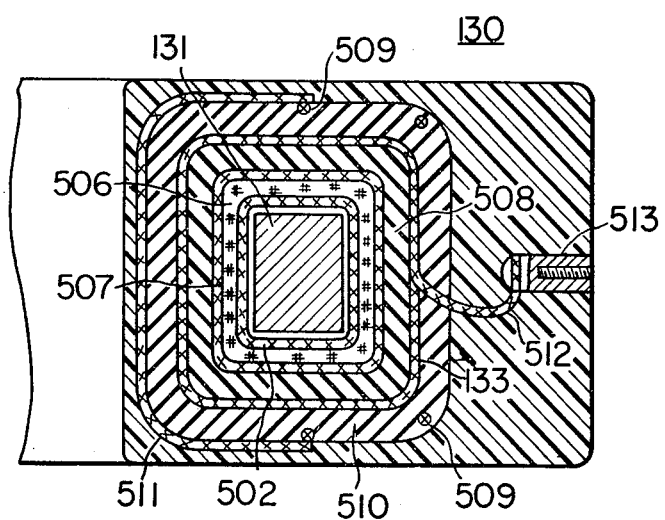
FIGS. 16 and 17 are respectively longitudinal sections of transformer units as other embodiments of the present invention, each section taken along line XVI—XVI as in FIG. 15.

FIGS. 15 and 16 show an example of a pulse transformer embodying the present invention; FIG. 15 showing a horizontal cross section of a transformer unit and FIG. 16 a vertical cross section of the same transformer unit. A transformer unit 130 has a ring-shaped magnetic core 131 with a pair of compensating windings 501 and 502 wound thereabout substantially in diametrically opposite relation to each other.

Plural pairs of such compensating windings may be provided equidistantly apart from each other along the core, according to the number of the secondary windings to be provided. Each pair of the secondary windings have the same number of turns and differentially connected with each other.

The insulation between the core 131 and the compensating windings 501 and 502 is established by forming the windings with insulator-coated conductor or by covering the core with insulating paper or cotton tape.

On the compensating windings is formed a stress-absorbing layer 506. The stress-absorbing layer 506 is formed by coating or spraying polyethylene on the wax-impregnated layer of insulating paper or cotton tape wrapping to a predetermined thickness the core with the compensating windings.

A conducting shield 507 for the magnetic core, of metal foil, carbon paper or metal network is then formed on the stress-absorbing layer 506 and an insulating layer 508 is formed on the conducting shield 507. A plurality of secondary windings 133 are provided on the insulating layer 508. Each of the secondary winda primary conductor passing through said insulating cylinder at the center thereof and connected with a pulse generator; and a plurality of transformer units stacked one upon another and arranged in skewered condition on said insulating cylinder, each said unit having a magnetic core with a plurality of secondary windings wound thereabout which windings supply gating voltages for the gates of thyristors connected in series, wherein said innermost conductive layer is electrically insulated from said primary conductor and grounded toward said high voltage terminal.

2. A driving device for a thyristor type AC-DC converter, comprising a pair of parallel disposed insulating cylinders, each having therein a pair of capacitors, each capacitor being disposed near the end of said insulating cylinder and having a plurality of coaxially disposed conductive layers whose axial lengths decrease toward the outer surface of said insulating cylinder, and the innermost conductors of said capacitors being axially separated from each other and grounded only near the ends of said insulating cylinder;

a primary conductor passing through said insulating cylinders at the centers thereof and connected with a pulse generator; and a plurality of transformer units stacked one upon another and arranged in skewered condition on each of said insulating cylinders, each transformer unit having a magnetic core with a plurality of secondary windings wound thereabout which windings supply gating voltages for the gates of the thyristors connected in series.

3. A driving device for a thyristor type AC-DC converter as claimed in claim 2, wherein the secondary windings of the transformer units of one of said insulating cylinders and the secondary windings of the transformer units of the other insulating cylinder are connected alternatively with the series-connected thyristors of said converter to control the gates of said thyristors.

4. A driving device for a thyristor type AC-DC converter, comprising at least two insulating cylinders, each having therein two capacitors separated axially of said insulating cylinder from each other, each of said capacitor consisting of a plurality of coaxial conductive layers;

a primary conductor passing through said insulating cylinders at the centers thereof and connected with a pulse generator;

a plurality of transformer units stacked one upon another and arranged in skewered condition on each of said insulating cylinders, each transformer unit having a magnetic core with a plurality of secondary windings wound thereabout which windings supply gating voltages for the gates of the thyristors connected in series;

a pair of first means each of which is disposed near the uppermost transformer unit of each insulating cylinder for conducting a surge current flowing in through the terminal of said converter radially from outside the core of said uppermost transformer unit to the outermost conductive layer of the correspondng capacitor of said insulating cylinder; and a pair of second means each of which serves to cancel the magnetic flux generated due to said surge current, through the transformer units of each insulating cylinder near the path of said surge current.

5. A driving device for a thyristor type AC-DC converter as claimed in claim 4, wherein each of said first means comprises a conductor disposed above the uppermost transformer unit of the corresponding insulating cylinder and connected with the terminal of said converter and a plurality of lead wires to connect said conductor with the outermost conductive layer of the capacitor opposite to said uppermost transformer unit.

6. A driving device for a thyristor type AC-DC converter as claimed in claim 4, wherein each of said first means comprises a horn-shaped conductor disposed above the uppermost transformer unit of the corresponding insulating cylinder, the large-diameter periphery of said horn-shaped conductor extending outward beyond the periphery of said uppermost transformer unit; a means for connecting said large-diameter periphery of said horn-shaped conductor with the terminal of said converter; and a means for connecting the small-diameter periphery of said horn-shaped conductor with the outermost conductor layer of the capacitor corresponding to said uppermost transformer unit.

7. A driving device for a thyristor type AC-DC converter as claimed in claim 2, wherein each of said transformer units comprises at least a pair of compensating windings wound about its core in diametrically opposite relation to each other and differentially connected with each other; a conducting shield surrounding said differential windings inclusive of their differential connection part; and secondary windings wound about said conducting shield with a desired insulating layer coated thereon.

8. A driving device for a thyristor type AC-DC converter as claimed in claim 7, wherein the secondary windings of each transformer unit are disposed in the vicinity of one of said pair of compensating windings.

9. A driving device for a thyristor type AC-DC converter as claimed in claim 2, wherein each of said transformer units comprises at least a pair of compensating windings wound about its core in diametrically opposite relation to each other and differentially connected with each other; a differential winding wound about said core and connected differentially with the differential winding of the corresponding transformer unit; a conducting shield surrounding said compensating windings and said differential winding, inclusive of the differential connection part of said compensating windings; and secondary windings wound about said conducting shield with a desired insulating layer coated thereon.

10. A driving device for a thyristor type AC-DC converter, comprising at least one insulating cylinder having a plurality of conductive layers disposed coaxially near each of upper and lower ends thereof and constituting a capacitor formed therein, said conductive layers having different axial lengths decreasing from the innermost to outermost layer thereof, said innermost layer being extended midway of said cylinder;

ings 133 is disposed near one of the compensating windings, e.g., in an opposite relation to the compensating winding.

On the insulating layer 508 is also provided a plurality of differential windings 136 in the vicinity of the secondary windings 133.

A uniformly wound, continuous conductor can play a role similar to that of the differential windings, but in a preferable form of the differential windings, a plurality of discretely distributed windings are provided in the vicinity of the secondary windings and connected in parallel with each other by connection leads 509. With the latter preferable configuration, the voltage induced in each differential winding can be reduced and therefore its insulation can be made more facilitated.

An insulating layer 510 is formed on the secondary windings 133 and the differential windings 136, an outer conducting shield 511 is formed on the insulating layer 510, and the taking-out lead wires 512 of the secondary windings 133 and the differential windings 136 are connected with terminal metals 513. Finally, the thus prepared assembly is molded with epoxy resin to complete a transformer unit.

In this transformer unit, the inner conducting shield 507 and the outer conducting shield 511 are connected with each other to maintain the same potential. Such connection may be made by the taking-out lead wire 512. In this way, the compensating windings 501 and 502 and their connection leads are disposed at the positions on the core 131 which are kept at the same potential by means of the conducting shield so that the insulations between the compensating windings 501 and 502 and the secondary windings 133 may be omitted. Accordingly, the radial length and the height of the transformer unit can be made smaller and the overall size can be reduced.

Since the compensating windings 501 and 502 are disposed at the positions kept at the same potential, the distributed electrostatic capacitances of the compensating windings can be reduced to zero, so that the intrusion of the surge current into the pulse transformer can be correspondingly reduced.

Figure 17:
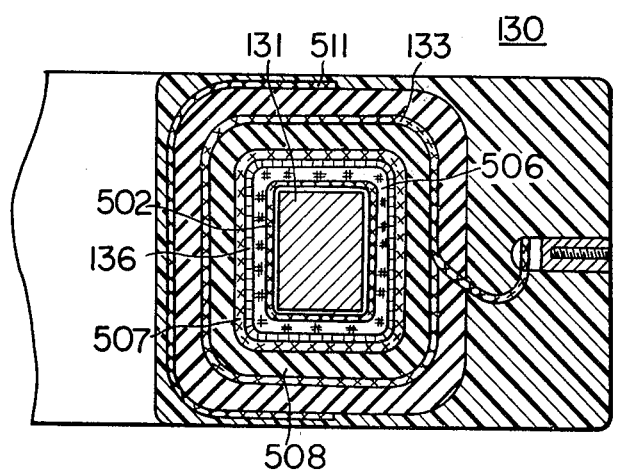

FIG. 17 shows in vertical cross section a transformer unit of a pulse transformer as another embodiment of the present invention, in which the differential windings 136 are also provided inside the conducting shield 507 so that the overall size of the pulse transformer may be further lessened and that the distributed capacitances may be reduced.

In this case, it is preferable that the differential windings 136 should be wound on the stress-absorbing layer 506 and the taking-out leads of the differential windings should be disposed outside the stress-absorbing layer 506, so that there may be no need for perforations in the stress-absorbing layer 506 through which the taking-out leads are to the passed and which cause the resin to leak into the stress-absorbing layers 506.

The above description has been given solely to the case where the present invention is applied to resin-mold type pulse transformers, but it is apparent that the present invention can be applied also to the oil-immersed-paper insulation type pulse transformer.

Figure 18:
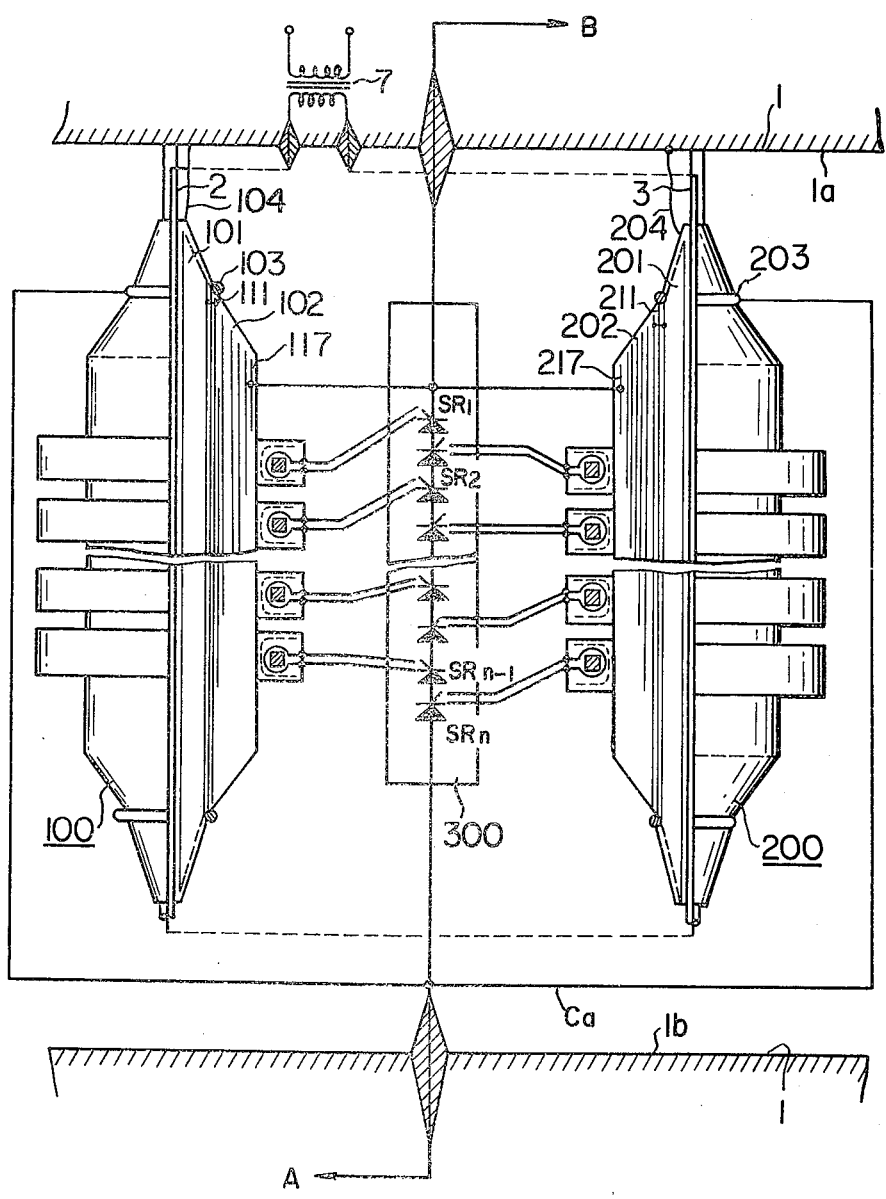
FIG. 18 illustrates the electric connection of a driving device as another embodiment of the present invention.

In the preceding embodiments, each of the insulating cylinders 100 and 200 has a single structure, but it is also possible according to the present invention to modify each insulating cylinder into a double bushing structure as shown in FIG. 18. Namely, as seen in FIG. 18, each of the insulating cylinders 100 and 200 has a double condenser bushing structure, in which inner bushings 101 and 201 are coaxially inserted in outer bushings 102 and 202 and the innermost conductive layers of the outer bushings 102 and 202 are connected through surface shields 103 and 203 and cables Ca with the anode of the uppermost thyristor SRn of the thyristor stack group 300 and moreover kept at the same potential as the outermost conductive layers of the inner bushings 101 and 201. The outermost conductive layers of the outer bushings 102 and 202 are connected commonly with the cathode of the lowermost thyristor $SR_1$ of the thyristor stack group 300. The innermost conductive layers of the inner bushings 101 and 201 are electrically connected through lead wires 104 and 204 with the upper wall 1a of the tank 1 to which center pipes 2 and 3 of the bushings 101 and 201 are also coupled. The dimensions and arrangements of the conductive layers of the voltage dividing capacitors in the outer bushings 102 and 202 are so designed that each conductive layer may be placed opposite to the outer shield of the corresponding transformer unit, the outer shield being connected with one (preferably having an intermediate potential) of the secondary windings of the transformer unit.

Next, the description will be made of how the influence by an external surge can be eliminated in the pulse transformer according to the present invention, when its thyristors are conducting or cut off.

If a surge is introduced from the DC terminal B when the thyristor stack group 300 is cut off, the surge current which flows inside the cores of the transformer units is divided into two components; one flowing through the outermost conductive layers 117 and 217 of the outer bushings 102 and 202 and through the electrostatic capacitances of the double condenser bushings and the other flowing through the electrostatic capacitances between the outer shields of the transformer units and the center pipes 2 and 3. Concerning the former surge component, the final exits are the upper wall of the tank connected with the center pipes 2 and 3 and the cables Ca. In either case, the surge current flows outside the magnetic cores so that it can exert no harmful influence on the transformer units. As regards the latter surge component, on the other hand, the shield of each transformer unit and one of the conductive layers 111 to 116 and 211 to 216 of the outer bushings 102 and 202 placed opposite to the shield are kept at the same potential and establishes a high impedance so that no harmful surge current can be introduced through the shield. According to the present invention, therefore, the erroneous operation of the thyristor stack group can be completely eliminated.

Moreover, in case where an external surge is introduced through the AC terminal when the thyristor stack group 300 is conductive, the erroneous operation can be prevented in the same manner.

What we claim is:

1. A driving device for a thyristor type AC-DC converter, comprising
  at least one insulating cylinder having a plurality of conductive layers constituting a capacitor formed therein and near at least one end thereof disposed nearer the high voltage terminal of said device, the innermost one of said conductive layers being extended midway of said cylinder;

a primary conductor passing through said insulating cylinder at the center thereof and connected with a pulse generator; and a plurality of transformer units stacked one upon another and arranged in skewered condition on said insulating cylinder, each said unit having a magnetic core with a plurality of secondary windings wound thereabout which windings supply gating voltages for the gates of thyristors connected in series, wherein said innermost conductive layers are electrically insulated from said primary conductor, isolated in the axial direction from each other at a predetermined distance, and grounded axially outside said insulating cylinder through respective ends of the insulating cylinder.

11. A driving device for a thyristor type AC-DC converter as claimed in claim 10, wherein said transformer units of said insulating cylinder are equally divided into an upper group and a lower group, the transformer units belonging to said upper group being placed electrostatically opposite to said innermost conductive layer of said upper end of said insulating cylinder, and the transformer units belonging to said lower group being placed electrostatically opposite to said innermost conductive layer of said lower end of said insulating cylinder.

12. A driving device for a thyristor type AC-DC converter as claimed in claim 11, wherein each of said outermost conductive layers is disposed closely near the end of said insulating cylinder.

13. A driving device for a thyristor type AC-DC converter as claimed in claim 10, wherein the axial ends, near the midway of said insulating cylinder, of said conductive layers of each capacitor are terminated at a predetermined axial distance with each other so that each said transformer unit may be placed opposite to corresponding one of said conductive layers.

14. A driving device for a thyristor type AC-DC converter as claimed in claim 10, wherein said transformer units of said insulating cylinder are equally divided into two groups substantially midway of said insulating cylinder, the transformer units belonging to each group being equidistantly apart from each other, and the interval between two transformer units belonging to each group is smaller than that between said two groups.

15. A driving device for a thyristor type AC-DC converter as claimed in claim 10, wherein the outermost conductive layer of one of said capacitors in said insulating cylinder is connected with the input terminal of the thyristor main circuit consisting of said series-connected thyristors while the outermost conductive layer of the other of said capacitors in said insulating cylinder is connected with the output terminal of said thyristor main circuit.

16. A driving device for a thyristor type AC-DC converter as claimed in claim 10, wherein a conducting shield for electrostatic shielding is provided for each said transformer unit, said conducting shield being disposed at least in a portion within said transformer unit opposite to said insulating cylinder so as to shield the secondary windings of said unit, the conducting shield of the uppermost one of said transformer units being connected to said outermost conductive layer of said upper end of said insulating cylinder, and the conducting shield of the lowermost one of said transformer units being connected to said outermost conductive layer of said lower end of said insulating cylinder.

17. A driving device for a thyristor type AC-DC converter as claimed in Claim 16, wherein the conducting shields of said uppermost and lowermost transformer units are connected respectively with the junction point between the two extreme thyristors nearest the input terminal of said thyristor main circuit and the junction point between the two extreme thyristors nearest the output terminal of said thyristor main circuit, and the outermost conductive layers of said upper and lower ends of said insulating cylinder are connected respectively with said input and output terminals of said thyristor main circuit.

* * * * *